(12) United States Patent
Botman et al.

(10) Patent No.: US 10,943,482 B2
(45) Date of Patent: Mar. 9, 2021

(54) SELECTION OF IDENTIFIERS

(71) Applicant: Arm IP Limited, Cambridge (GB)

(72) Inventors: Francois Christopher Jacques Botman, Cambridge (GB); Thomas Christopher Grocutt, Cambridge (GB); Daryl Wayne Bradley, Over (GB); Marianne Crowder, Cambridge (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 16/454,022

(22) Filed: Jun. 26, 2019

(65) Prior Publication Data

US 2020/0005640 A1 Jan. 2, 2020

(30) Foreign Application Priority Data

Jun. 27, 2018 (GB) ..................................... 1810542

(51) Int. Cl.
| | |
|---|---|
| *G08G 1/14* | (2006.01) |
| *H04W 4/48* | (2018.01) |
| *H04L 29/08* | (2006.01) |
| *H04W 4/021* | (2018.01) |
| *B60Q 1/56* | (2006.01) |

(52) U.S. Cl.
CPC .............. *G08G 1/143* (2013.01); *B60Q 1/56* (2013.01); *H04L 67/12* (2013.01); *H04W 4/021* (2013.01); *H04W 4/48* (2018.02); *Y10S 40/91* (2013.01)

(58) Field of Classification Search
CPC ......... G08G 1/143; B60Q 1/56; H04W 4/021; H04W 4/48; H04L 67/12; Y10S 40/91; G06K 2209/15; G07C 1/30
See application file for complete search history.

(56) References Cited

U.S. PATENT DOCUMENTS

| | | | |
|---|---|---|---|
| 2014/0379475 A1 | 12/2014 | Sarangi | |
| 2018/0060008 A1* | 3/2018 | Bender | ................. G09G 3/3225 |
| 2018/0186309 A1* | 7/2018 | Batten | ..................... B60Q 1/56 |

FOREIGN PATENT DOCUMENTS

| | | | | |
|---|---|---|---|---|
| DE | 102014009639 | * | 12/2015 | ........... G07B 15/063 |
| DE | 102014009639 A1 | | 12/2015 | |

(Continued)

OTHER PUBLICATIONS

Combined Search and Examination Report under Sections 17 and 18(3), App. No. GB181:0542.9, dated Dec. 11, 2018, 7 Pages.

(Continued)

*Primary Examiner* — Brian Wilson
(74) *Attorney, Agent, or Firm* — Berkeley Law & Technology Group, LLP

(57) ABSTRACT

An apparatus comprising an input to receive identifier parameters for one or more identifiers, where the identifiers are displayable at a display device mounted or mountable in a vehicle. The apparatus may comprise a storage device to store identifier parameters for at least one of the one or more identifiers. The apparatus may also comprise a locating module to determine a location parameter relating to the display device. Also the apparatus may comprise a processor to select an identifier for display at the display device based, at least in part, on the stored identifier parameters for one of the one or more identifiers matching the location parameter relating to the display device.

20 Claims, 5 Drawing Sheets

(56) References Cited

FOREIGN PATENT DOCUMENTS

GB            2543419 A     4/2017
WO     2016173767 A1    11/2016

OTHER PUBLICATIONS

Examination Report under Section 18(3), App. No. GB1810542.9, dated Feb. 25, 2020, 5 Pages.
Examination Report under Section 18(3), App. No. GB1810542.9, dated Aug. 20, 2020, 3 Pages.

* cited by examiner

SELECTION OF IDENTIFIERS

This application claims the benefit of priority to United Kingdom Application No. GB1810542.9, filed on Jun. 27, 2018, which is incorporated herein by reference in its entirety.

BACKGROUND

Field

The present techniques relate to methods, apparatus and systems for selecting identifiers, and in particular identifiers for display. More particularly, the techniques relate to methods, apparatus and systems for selecting geographically constrained identifiers for display at a vehicle mountable display device.

Information

Cloud computing services are becoming more common. More and more devices are being connected to the cloud, for example as part of the "Internet of Things" (IoT). For example, devices such as temperature sensors, healthcare monitors and electronic door locks can be connected to the cloud so that they can be accessed and controlled using remote systems. For example, a door may be remotely opened from a remote platform, or data from a temperature sensor or healthcare monitor may be aggregated at a remote location and accessed from another device. Hence, there is an increasing amount of data being collected by cloud platforms and their providers.

DETAILED DESCRIPTION

Figure 1:
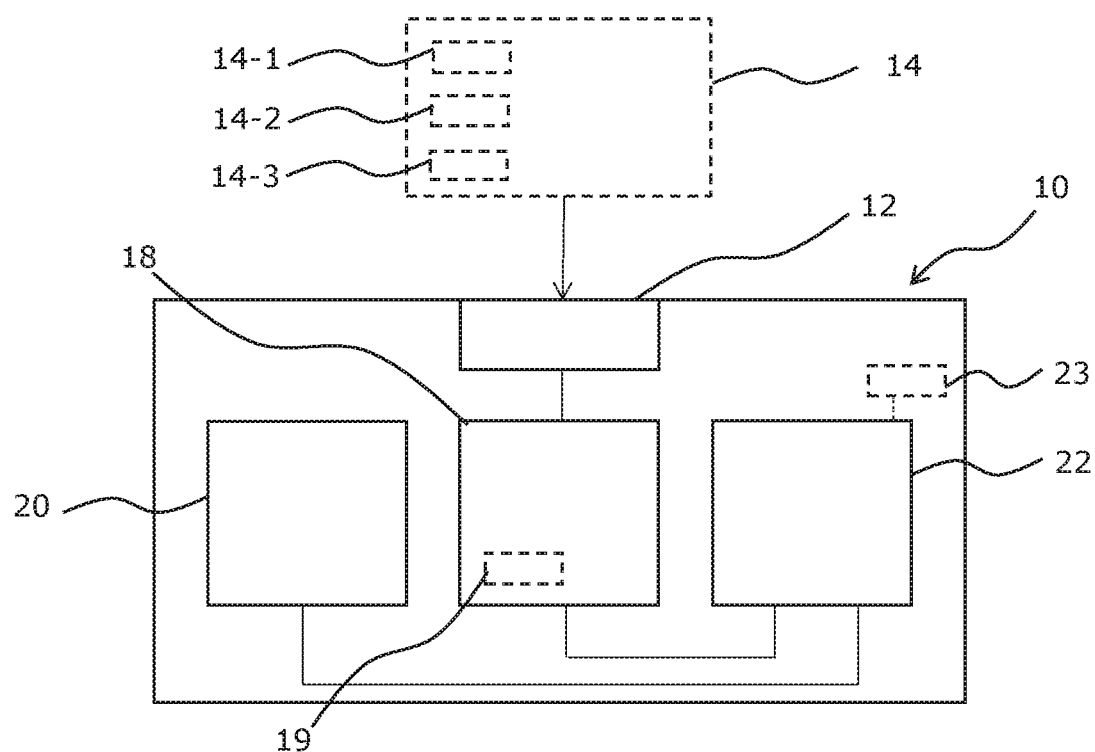
FIG. 1 illustrates a schematic diagram of an apparatus according to various example embodiments.

A number of parking and vehicular transportation systems may use automatic number plate recognition (ANPR). However, in such systems parking permission and transportation permission may be tied to specific vehicles, meaning a user may not be able to validly park or travel while using an alternative vehicle which may not be recognised as having permission to park in the location of the ANPR system and/or travel through an area having an ANPR system.

In parking systems, there may also be an increasing use of identifiers, such as badges and permits, which may be required to be displayed in vehicles, for example on a vehicle windshield or windscreen, to grant access to various geographic locations. Such identifiers may occupy space on the windshield, and in numbers may have a negative impact on the visibility of the vehicle driver and therefore present a safety hazard.

It would therefore be desirable to provide an alternative system.

According to a first aspect of the present technique, there is provided an apparatus comprising: an input to receive identifier parameters for one or more identifiers displayable at a vehicle mountable display device; a storage device to store the identifier parameters for at least one of the one or more identifiers; a locating module to determine a location parameter relating to the vehicle mountable display device; and a processor to select an identifier for display at the vehicle mountable display device based, at least in part, on the stored identifier information for one of the one or more identifiers matching the location parameter relating to the vehicle mountable display device.

According to a second aspect of the present technique, there is provided an apparatus comprising: an input to receive identifier parameters for one or more identifiers displayable at a vehicle mountable display device; a storage device to store the identifier parameters for at least one of the one or more identifiers; a locating module to determine a location parameter relating to the vehicle mountable display device; and a processor to select an identifier for display at the vehicle mountable display device based, at least in part, on the stored identifier parameters for one of the one or more identifiers matching the location parameter relating to the vehicle mountable display device; and a service to communicate identifier information to the apparatus. The input of the apparatus may receive the identifier parameters from the service.

According to a third aspect of the present technique, there is provided a method comprising: receiving identifier parameters for one or more identifiers displayable at a vehicle mountable display device; storing the identifier parameters for at least one of the one or more identifiers; determining a location parameter relating to the vehicle mountable display device; and selecting an identifier for display at the vehicle mountable display device based, at least in part, on the stored identifier parameters for one of the one or more identifiers matching the location parameter relating to the vehicle mountable display device.

According to a fourth aspect there is provided a vehicle display device comprising: a first input to receive identifier parameters for one or more identifiers to display on the device; a storage device to store the identifier parameters for at least one of the one or more identifiers; wherein responsive to receiving location parameters defining a location of the device, the device to select one or more of the identifiers for displaying on the display matching location parameter associated with the identifier parameters.

As will be appreciated by one skilled in the art, the present techniques may be embodied as an apparatus, a system, a method or a computer program. Accordingly, present techniques may take the form of an entirely hardware embodiment, an entirely software embodiment, or an embodiment combining software and hardware aspects.

Figure 2:
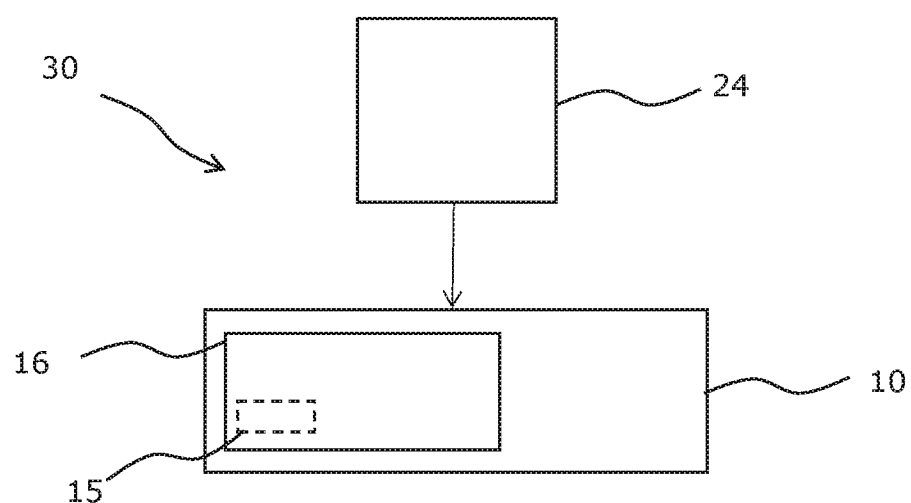
FIG. 2 illustrates a schematic diagram of a first example apparatus in a system according to various example embodiments.
Figure 3:
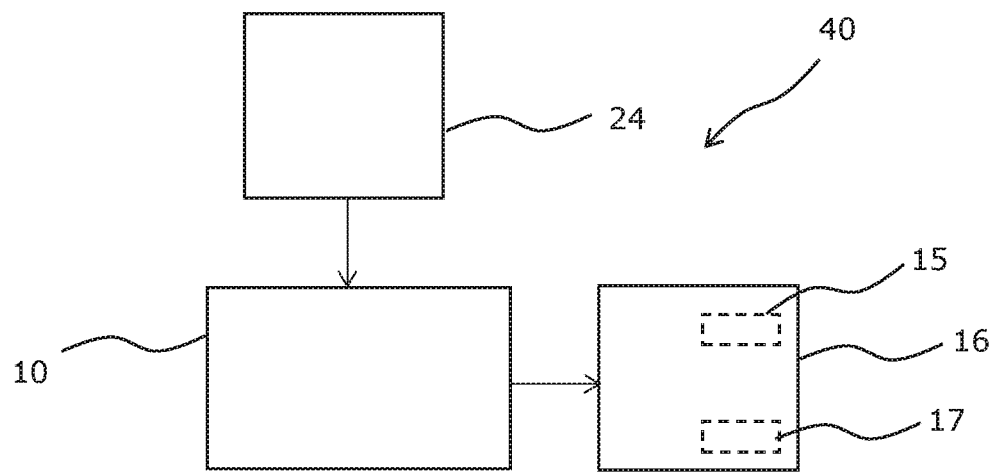
FIG. 3 illustrates a schematic diagram of a second example apparatus in a system according to various example embodiments.
Figure 4:
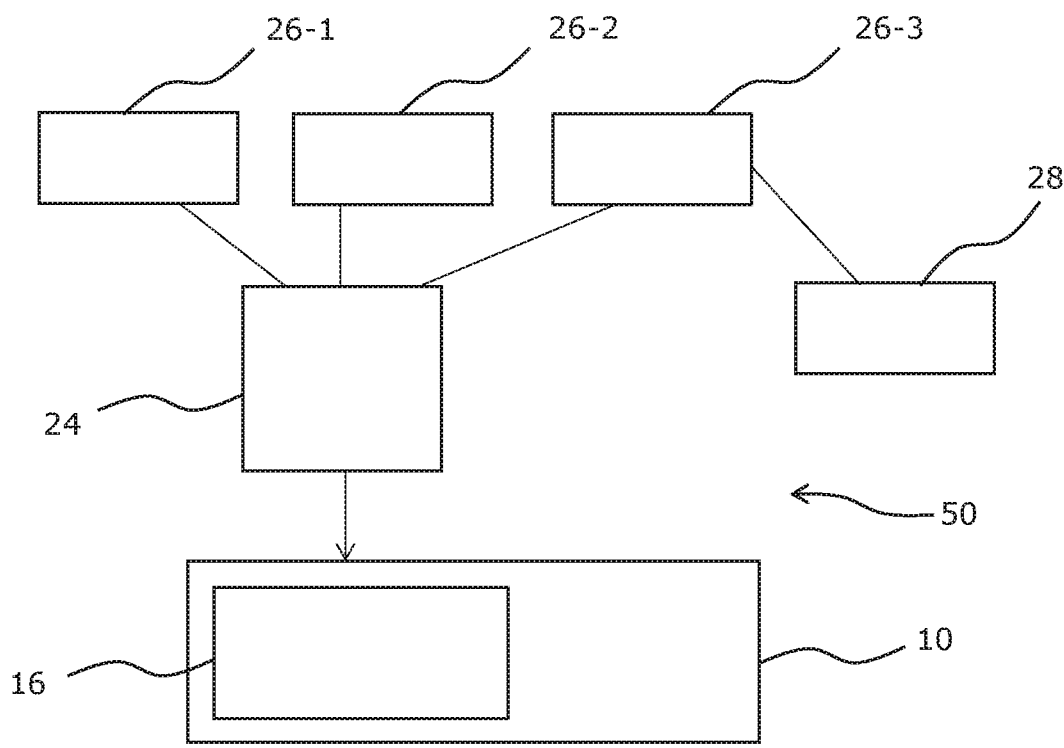
FIG. 4 illustrates a schematic diagram of an example system according to various example embodiments.
Figure 5:
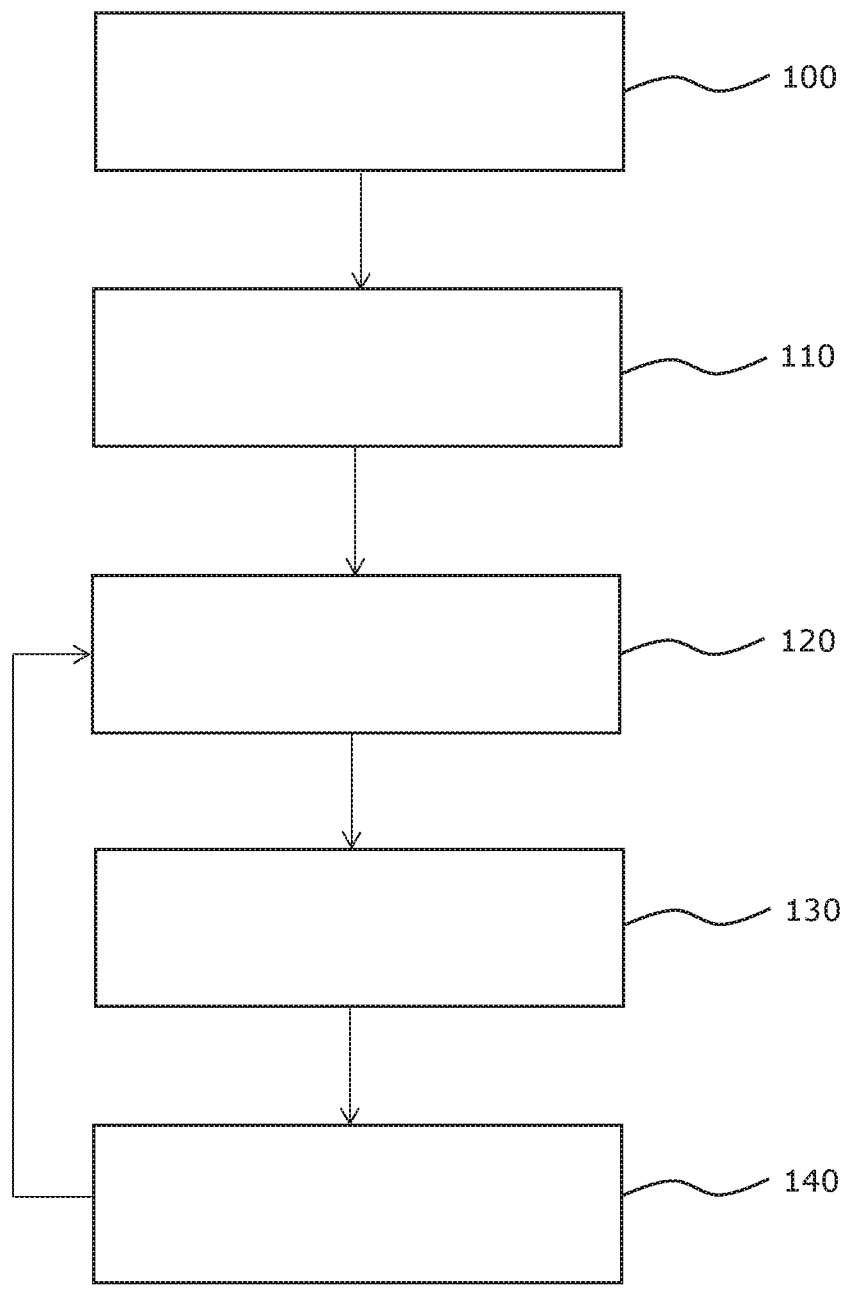
FIG. 5 illustrates a flow diagram of blocks of a method according to various example embodiments.
Figure 6:
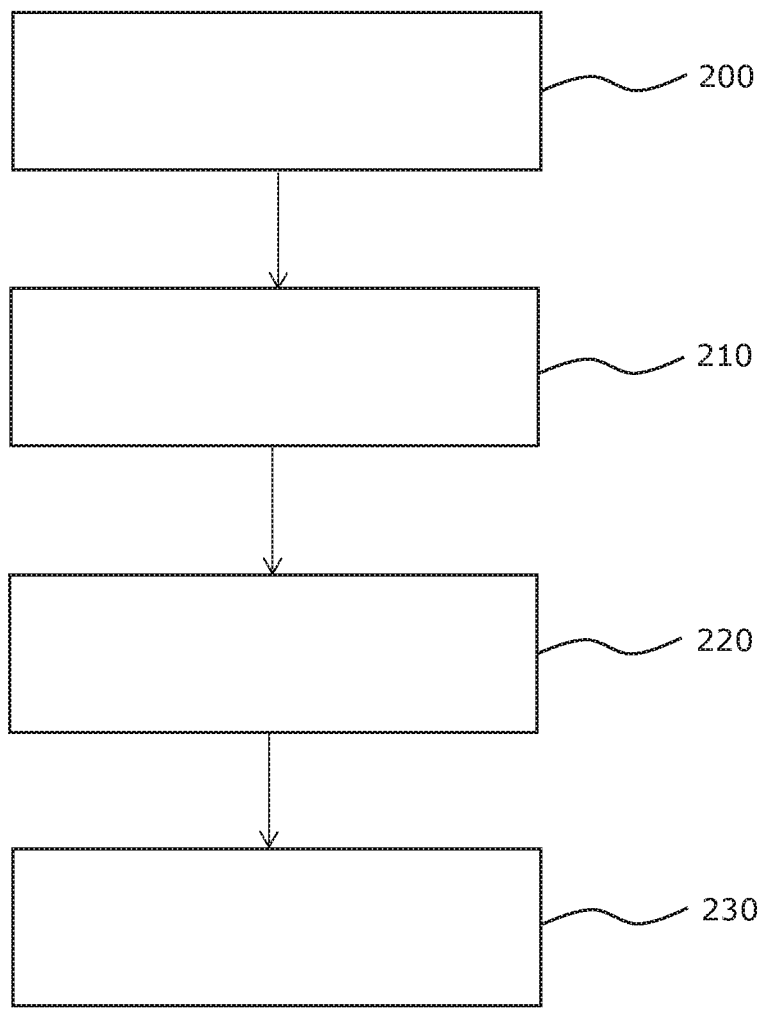
FIG. 6 illustrates a flow diagram of blocks of a method according to various example embodiments.
Figure 7:
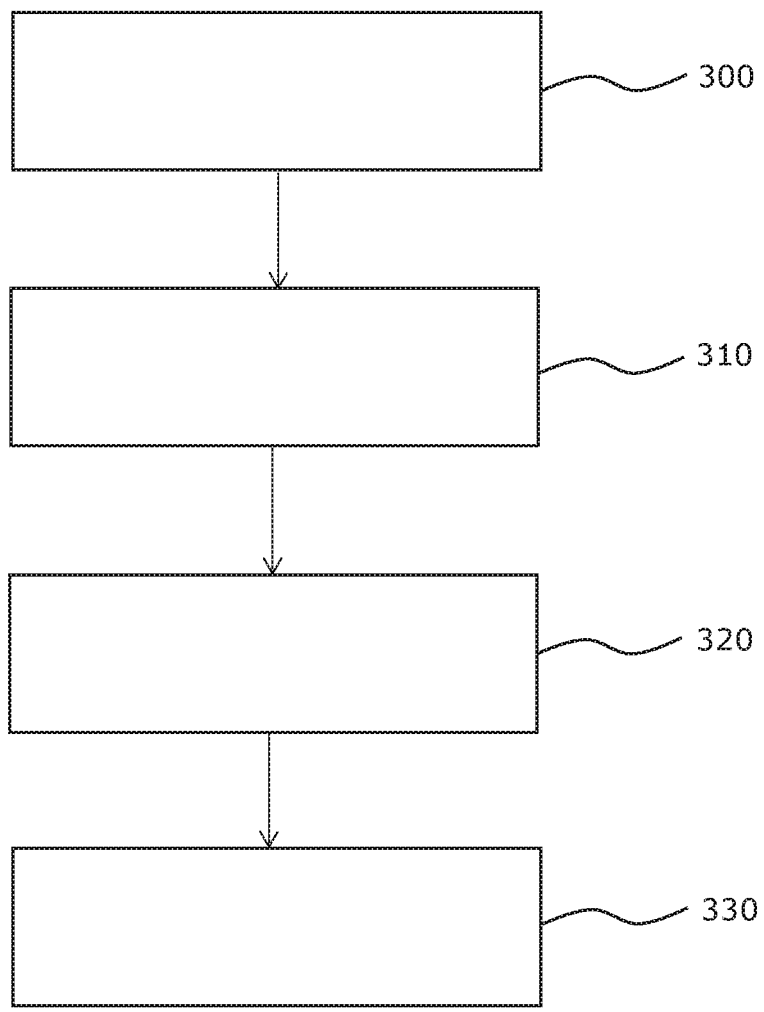
FIG. 7 illustrates a flow diagram of blocks of a method according to various example embodiments.

Embodiments will now be described with reference to the accompanying figures in which:

FIG. 1 illustrates a schematic diagram of an apparatus according to various example embodiments;

FIG. 2 illustrates a schematic diagram of a first example apparatus in a system according to various example embodiments;

FIG. 3 illustrates a schematic diagram of a second example apparatus in a system according to various example embodiments;

FIG. 4 illustrates a schematic diagram of an example system according to various example embodiments;

FIG. 5 illustrates a flow diagram of blocks of a method according to various example embodiments;

FIG. 6 illustrates a flow diagram of blocks of a method according to various example embodiments; and FIG. 7 illustrates a flow diagram of blocks of a method according to various example embodiments.

FIG. 1 illustrates a schematic diagram of an apparatus 10 comprising an input 12, in the form of a transceiver, to receive identifier parameters 14 for one or more identifiers displayable at a display device, such as a vehicle mounted, or vehicle mountable display device 16, as illustrated in FIG. 2 and FIG. 3. Vehicle mountable display device 16 may be considered to be an IoT device, for example.

An identifier, which may be displayable at vehicle mountable display device 16, may be in the form of a badge, ticket, permit, licence, and/or other visual indicator which provides a user of a vehicle, and/or the user's vehicle, with specific permissions. For example, an identifier may provide a permission to park at, and/or grant access to, a location, in particular a predefined geographic location such as a vehicle parking location, which may be a car park.

In some embodiments apparatus 10 may additionally comprise a programmable radio frequency identification (RFID) component which may be programmed to provide access to a location relating to an identifier, which may have, for example, a gated and/or barrier access.

Whilst input 12 in the embodiment of FIG. 1 is described as a transceiver, input 12 may comprise any form of communication device and/or apparatus which may act as a receiver of data.

Input 12 may receive the identifier parameters 14 from another resource in communication therewith. Such a resource may illustratively depicted as a service and/or service platform 24 in FIGS. 2, 3 and 4 but claimed subject matter is not limited in this respect and such a resource may comprise a device and/or apparatus. In embodiments a service and/or service platform may comprise one or more remote computing devices such as in a cloud based server system such as a public cloud based server system on a public cloud infrastructure, and/or a private cloud based server system on a private cloud infrastructure. In further embodiments a service and/or service platform may comprise an on-premise based server system hosted on a private infrastructure or may comprise a combination of the public, private and/or on-premise server systems.

In some embodiments, input 12 may additionally or alternatively comprise an image capture device for capturing an image of an identifier and/or features relating to an identifier. Such an image capture device may comprise an electro-optical sensor. image capture device may comprise a camera, such as a mobile device camera. An image of an identifier may be captured and/or scanned, and/or machine readable parameters relating to an identifier may be captured and/or scanned, such as by imaging and/or scanning a barcode and/or a data matrix, such as a quick response (QR) code®. Image recognition may be used to provide signals from the captured and/or scanned image that may be used to facilitate the reception of identifier parameters 14, for example from a resource 24.

For at least one of one or more identifiers, identifier parameters 14 may comprise identifier location parameters 14-1 for defining one or more of: geographical parameters such as a geographical area within which an identifier may be automatically displayed at vehicle mountable display device 16; and temporal parameters comprising times and/or dates at which an identifier may be automatically displayed at vehicle mountable display device 16. An identifier may define a virtual perimeter for a real world geographic area to provide geo-fencing for selection of an identifier based, at least in part, on location. A geographical area may be defined as a radius around a point location and/or defined as a predetermined boundary and/or set of boundaries, for example.

For at least one of one or more identifiers, identifier parameters 14 may comprise identifier image parameters 14-2 displayable at vehicle mountable display device 16. Identifier image parameters 14-2 may be persistently displayable at vehicle mountable display device 16. Identifier image parameters 14-2 may comprise a physical representation of a badge, ticket, permit, licence, and/or other visual indicator which provides a user of a vehicle, and/or the user's vehicle, with specific permissions. Such a physical representation may, for example, comprise a logo affiliated with the location, such as a company logo.

For at least one of one or more identifiers, identifier parameters 14 may comprise identifier authentication and/or validation parameters 14-3 displayable at vehicle mountable display device 16. Identifier authentication and/or validation parameters 14-3 may be persistently displayable at vehicle mountable display device 16

For at least one of one or more identifiers, identifier authentication and/or validation parameters 14-3 may be stored upon vehicle mountable display device 16.

Identifier authentication parameters 14-3 may be comprised in identifier image parameters 14-2 or be separate thereto. Identifier authentication parameters 14-3 may comprise user decipherable visual data, for example a colour, symbol, readable alphanumeric data such as a parking expiry time, and/or similar user identifiable authentication indication for determining that an identifier displayed at vehicle mountable display device 16 is valid. Identifier authentication parameters 14-3 may comprise machine readable visual data, for example a barcode, data matrix (e.g. QR code®), machine readable alphanumeric characters, and/or similar machine identifiable authentication parameters for determining that an identifier displayed at vehicle mountable display device 16 is valid. Identifier authentication parameters 14-3 may comprise machine readable parameters, readable via a near field communication (NFC), RFID, and/or similar non-visual data conveyor.

Apparatus 10 may comprise storage 18 which may comprise one or more storage devices such as a memory to store signals such as identifier parameters 14 for at least one of the one or more identifiers.

Whilst storage 18 in the embodiment of FIG. 1 may be described as a memory, it is considered that storage 18 may also be defined as semiconductor memory, electronic circuitry, and/or any means of storing signals representing parameters, values, conditions, images, states, etc., for subsequent retrieval. Although memory may be illustrated as a single component, it should be understood that memory may be implemented as one or more separate components some or all of which may be integrated/removable and/or may provide permanent/semi-permanent/dynamic/cached storage. Storage 18 may comprise a volatile memory, such as random access memory (RAM), for use as temporary memory, and/or non-volatile memory such as Flash, read only memory (ROM), and/or electrically erasable programmable ROM (EEPROM), for storing data. Furthermore, storage 18 may also be used to store data and/or programs and/or instructions for operation of apparatus 10.

Apparatus 10 comprises location determination means in the form of a locating device and/or locating module 20, for determining a location parameter relating to the location of vehicle mountable display device 16.

Locating module 20 may determine a location parameter relating to vehicle mountable display device 16 based, at least in part, on one or more of: global positioning system (GPS) data; wireless local area network connectivity data, such as Wi-Fi® connectivity data; cellular network connectivity data; date information; and time information.

The location parameter may comprise one or more of: a spatial parameter relating to a current geographic location of vehicle mountable display device 16; and a temporal parameter relating to a current time and/or date.

In an embodiment of FIG. 1, locating module 20 is in the form of a global positioning system (GPS) receiver to determine a location parameter relating to vehicle mountable display device 16. Such a location parameter may comprise spatial coordinates, including at least a latitude and a longitude, of apparatus 10, which are then related to an associated vehicle mountable display device 16.

In some embodiments, as illustrated in FIG. 2, vehicle mountable display device 16 is comprised in apparatus 10, and therefore the spatial coordinates of vehicle mountable display device 16 may be the same as the spatial coordinates of apparatus 10.

In some embodiments, as illustrated in FIG. 3, vehicle mountable display device 16 is separate to apparatus 10. For example, apparatus 10 may be comprised in a mobile device separate to, and communicatively coupleable to and/or with, vehicle mountable display device 16, vehicle mountable display device 16 acting as an envoy device to an application running on such a mobile device. Such a mobile device may comprise a mobile phone, such as a smartphone.

In embodiments where vehicle mountable display device 16 is separate to apparatus 10, spatial coordinates of vehicle mountable display device 16 may not necessarily the same as spatial coordinates of apparatus 10, unless apparatus 10 and vehicle mountable display device 16 are in very close proximity, but may be closely related while apparatus 10 is within close range of vehicle mountable display device 16. Apparatus 10 may need to be within close range of vehicle mountable display device 16 to be communicatively coupleable therewith, for instance to be communicatively coupleable via short-range wireless communication in the form of: a wireless local area network (WLAN); a wireless personal area network (WPAN), via infrared, Bluetooth, Zigbee and/or similar WPAN connectivity mechanism.

Whilst locating module 20 in an embodiment of FIG. 1 is described as a GPS receiver, it is considered that other locating modules 20 may be used to determine a location parameter.

In an embodiment, wireless local area network (WLAN) connectivity data may be alternatively or additionally used to determine a location parameter. While apparatus 10 connects to a WLAN, for example through a Wi-Fi® connection, a location parameter, in the form of spatial parameters, may be determined with some accuracy since such a WLAN may be geographically constrained, thus providing an indication of a location of apparatus 10.

In an embodiment, cellular connectivity signals may be alternatively or additionally used to determine a location parameter. In particular, a multilateration technique may be used where differences in distance from apparatus 10 to a number of cellular stations of known location through known timed broadcast signals may be determined, and these differences and known locations of the cellular stations may be used to provide an indication of a location of apparatus 10, to provide a location parameter in the form of spatial data.

In an embodiment, temporal data may be used to determine a location parameter. The temporal data may comprise date information and/or time information to define a location parameter comprising the current day and/or time.

Apparatus 10 comprises selection means in the form of processor 22, to select an identifier for display at vehicle mountable display device 16 based, at least in part, on the stored identifier parameters 14 for one of the one or more identifiers matching the location parameter relating to vehicle mountable display device 16.

Although processor 22 is illustrated as a single component it may be implemented as one or more separate components some or all of which may be integrated/removable.

Storage 18 may comprise a digital wallet (sometimes known as a secure wallet or a mobile wallet) on apparatus 10. A digital wallet is a connected service allowing an individual to make electronic transactions and for credential authentication, and may comprise encrypted payment information and passwords for one or more services. Processor 22 may access the digital wallet on apparatus 10 to select an identifier based, at least in part, on the identifier parameters 14 for one of the one or more identifiers matching the location parameter relating to vehicle mountable display device 16.

Processor 22 may also be defined as a microprocessor, a microcontroller, processing circuitry, and/or an integrated circuit.

The implementation of processor 22 may be in hardware alone, have certain aspects in software including firmware alone or may be a combination of hardware and software (including firmware).

Storage 18 may store a computer program 19 comprising computer program instructions (computer program code) that controls the operation of apparatus 10 when loaded into processor 22. The computer program instructions, of the computer program 19, provide the logic and routines that enables apparatus 10 to perform the method illustrated in FIG. 5. Processor 22, by reading storage 18 is able to load and execute the computer program 19.

Processor 22 may be coupled to storage 18 and locating module 20. In this context, coupled may mean either directly coupled or coupled via one or more intervening elements.

In some embodiments, the term matching in the context of processor 22 means that the stored identifier parameters 14 for one of the one or more identifiers is the same as or equates to the location parameter relating to vehicle mountable display device 16.

In some embodiments, the term matching in the context of processor 22 means that the location parameter relating to vehicle mountable display device 16 falls within certain parameters such as a distance from a specific location defined by the stored identifier parameters 14, and/or an area defined by the stored identifier parameters 14, rather than a specific location.

In some embodiments, the term matching in the context of processor 22 means that the location parameter relating to vehicle mountable display device 16 falls within certain parameters such as a certain time period defined by the stored identifier parameters 14, rather than at a specific time.

One or more of the one or more identifiers may be associated with a date or range of dates and/or a time or time period when the identifier is displayable, or configured to be displayed. In an example, one or more of the one or more identifiers may be associated with a range of dates, such as every weekday, that is Monday through Friday, and a time period, such as 8 am to 6 pm, when the identifier is displayable, or configured to be displayed. The identifier for example, may be a parking permit for a particular geographic location, such as a car park associated with the workplace of the user. This date and/or time information is stored as identifier parameters 14 in storage 18 of apparatus 10. The identifier will therefore be associated with this geographic location at these days and times, and the associated identifier parameters 14 may provide suitable identifier image parameters 14-2 displayable, or configured to be displayed, at vehicle mountable display device 16.

In certain circumstances, processor 22 may select, or identify for selection, multiple possible identifiers for display at vehicle mountable display device 16 based, at least in part, on the stored identifier parameters 14 for a plurality of identifiers matching an associated location parameter relating to vehicle mountable display device 16. In particular, a first identifier may be selected responsive at least in part to a location parameter, in the form of a spatial parameter relating to the current geographic location of vehicle mountable display device 16, matching stored identifier location parameters 14-1, and a second identifier may be selected responsive at least in part to a location parameter, in the form of a temporal parameter relating to the current date and/or time, matching stored identifier location parameters 14-1. In such circumstances an identifier may be chosen that is based, at least in part, on a spatial parameter in preference over an identifier based, at least in part, on a temporal parameter, since a relevance of an identified location of apparatus 10 may be higher than a relevance of an identified time and/or date. However, in certain circumstances it may be preferable to have a relevance of an identified time and/or date to be higher than a relevance of an identified location of apparatus 10, in which case an identifier may be chosen that is based, at least in part, on a temporal parameter in preference over an identifier based, at least in part, on a spatial parameter.

Apparatus 10 may comprise user control 23, which may be in the form of a button, dial, rocker switch and/or similar mechanical switch, a touch sensitive control such as a capacitance grid portion of apparatus 10, or a plurality thereof, on apparatus 10. For example, user control 23 may be an area of a capacitance grid type screen on a mobile device to provide a selectable function on the mobile device. Alternatively, or in addition, user control 23 may be a gesture control or a voice activated control. User control 23 may be used to manually select an identifier for display at vehicle mountable display device 16. In some embodiments, user control 23 may provide for a manual selection of an identifier, overriding any automatic selection by apparatus 10. In the example described above, when two identifiers are selected, or have been identified for selection by processor 22, the identifier may be automatically chosen that is based, at least in part, on a spatial parameter in preference over the identifier based, at least in part, on a temporal parameter. However, user control 23 allows for the user to manually override the automatic selection of the identifier based, at least in part, on a spatial parameter such that the identifier based, at least in part, on the temporal parameter may be selected for display at vehicle mountable display device 16.

It is envisaged that in some embodiments with a manual override function, that the manual selection of an identifier will nullify any automatic selection of an identifier until vehicle mountable display device 16 changes location to a location where a different identifier may be required.

The manual selection of an identifier, via user control 23, may be used to provide a machine learning input for apparatus 10, that is, manual selection of an identifier may be used to modify identifier parameters 14 such that future automatic selection of an identifier for the same location and/or date and/or time may utilise the modified identifier parameters 14 to select, or be more likely to select, the identifier which has been manually selected by the user. Manual selection may provide for modification of one of: the geographical area within which the identifier may be automatically displayed at vehicle mountable display device 16; and the temporal parameters comprising times and/or dates at which an identifier may be automatically displayed at vehicle mountable display device 16. Thus, as an illustrative example, when a user changes his or her working times at their place of work and is required to park in a specific car park outside of the temporal limitations set by the temporal information of the identification location parameters 14-1 of the identifier parameters 14 for an identifier associated with that car park, the manual selection may be used to teach apparatus 10 the modifications required to those temporal limitations for display of the identifier. Thus, as an illustrative example, a user may manually select an identifier which has identification location parameters 14-1 signifying that automatic identifier display should occur between 9 am and 5 pm, at a time outside of the time period identified in the identification location parameters 14-1, for example 8 am, and the identification location parameters 14-1 may then be modified such that the automatic identifier display should occur between 8 am and 5 pm. The machine learning for apparatus 10 may be more complex, requiring analysis of manual input over a time period before modifying the identification location parameters 14-1 of the identifier parameters 14 to prevent frequent changing of the identifier parameters in case of isolated and/or infrequent events requiring manual input.

When manually selecting an identifier to be displayed at vehicle mountable display device 16 via user control 23, including when the user selects a different identifier to that automatically selected by processor 22, geographic data and/or date and/or time information relating to the manual selection may be stored as historic data in one or more of: a resource such as a service and/or service platform and/or other network accessible storage; apparatus 10 (either comprising vehicle mountable display device 16 or not comprising vehicle mountable display device 16); and vehicle mountable display device 16 (when separate to apparatus 10). This historic data may then be used to modify the geographical information of the identifier location parameters 14-1 and/or temporal information of the identifier location parameters 14-1.

Information regarding the manual user selection of an identifier via user control 23, may be provided to a resource 24 such as service and/or service platform and used in a crowdsourcing data model, or similar data model, such that identifier parameters may be modified at the resource level with reliable data input from a plurality of users. An example of the use of such a crowdsourcing data model, would be to account for an extension and/or modification to the physical geographical boundary of a car park associated with an identifier.

The apparatus may be communicatively coupleable to a resource 24 (such as service and/or service platform) to receive the identifier parameters 14 from resource 24 prior to storing the identifier parameters 14 at storage 18.

Resource 24 communicates, for example by pushing, updates of identifier parameters 14 to apparatus 10. Resource 24 may provide revocation requests to revoke and/or delete identifier parameters 14 from apparatus 10.

Via communication between apparatus 10 and resource 24, for example by the push update function of resource 24, resource 24 may add identifier parameters 14 to apparatus 10 to create a new selectable identifier. For example, when a user purchases, and/or is provided with, a parking permit for a particular car park, resource 24 may push identifier parameters 14 relating to an associated identifier to be displayed at vehicle mountable display device 16 to apparatus 10. Once at apparatus 10, a new identifier may then be automatically selected, based, at least in part, on the identifier parameters 14, when vehicle mountable display device 16 is determined to be at the location of the car park. A new identifier may also be manually selectable as described above.

A new identifier may initially have no identifier location parameters 14-1, such that it may not be possible to automatically select the identifier. If a new identifier has no identifier location parameters 14-1 initially, then manual selection of the identifier may provide information to populate identifier location parameters 14-1 for the identifier, such that future automatic selection of the identifier is possible.

Via the push update function of resource 24, resource 24 may modify identifier parameters 14 existing at apparatus 10 to create a modified selectable identifier. For example, a car park may require frequent visual changes to an identifier to be displayed at vehicle mountable display device 16, such that a car parking attendant may easily visually determine whether a vehicle is validly parked in the car park. For example, the colour of the identifier to be displayed may change on a daily basis, making it easy for a car park attendant to visually check that vehicles in the car park have valid permits to park for that day.

Via a revocation request function of resource 24, resource 24 may delete and/or modify identifier parameters 14 from apparatus 10 to revoke the identifier such that it may no longer be selected for display at vehicle mountable display device 16. For example, when a subscription to a car parking service, and/or membership of an organisation ceases or lapses, resource 24 may provide a revocation request to cause the identifier parameters 14 to be removed and/or deleted from apparatus 10, or for identifier parameters 14 to be modified, such that the identifier is no longer selectable.

In embodiments where storage 18 comprises a digital wallet on apparatus 10 and in response to a push from resource 24, the identifier parameters 14 in the digital wallet may be updated.

In embodiments where storage 18 comprises a digital wallet on apparatus 10 and in response to a revocation request from resource 24, the identifier parameters 14 in the digital wallet may be deleted.

Therefore communication from resource 24 may effect changes to the digital wallet to add, update and/or revoke identifiers, thereby altering the selection of identifiers that may be automatically or manually selected at apparatus 10.

FIG. 2 illustrates an apparatus 10 in a first example system 30, where vehicle mountable display device 16 is comprised in apparatus 10. Apparatus 10, and therefore vehicle mountable display device 16, is communicatively coupleable to resource 24.

In embodiments where the vehicle mountable display device is comprised in apparatus 10, as illustrated in FIG. 2, resource 24 may push data directly to, or revoke data directly from, apparatus 10, for the display, or prevention of display, of the identifier at vehicle mountable display device 16.

FIG. 3 illustrates an apparatus 10 in a second example system 40, where apparatus 10 is comprised in a mobile device, separate to vehicle mountable display device 16. Apparatus 10 is communicatively coupleable to resource 24 and vehicle mountable display device 16 is communicatively coupleable to apparatus 10.

In embodiments where apparatus 10 is comprised in a mobile device, separate to vehicle mountable display device 16, as illustrated in FIG. 3, resource 24 may push data to, or revoke data from, vehicle mountable display device 16 via apparatus 10, for the display, or prevention of display, of the identifier at vehicle mountable display device 16.

In embodiments, such as that illustrated in FIG. 3, where apparatus 10 is comprised in a mobile device separate to, and communicatively coupleable to or with, vehicle mountable display device 16, apparatus 10 and vehicle mountable display device 16 may be coupled via short-range wireless communication or ultra-short-range wireless communication in the form of: a wireless local area network (WLAN); a wireless personal area network (WPAN), via infrared, Bluetooth, Zigbee or similar WPAN connectivity mechanism; a body area network (BAN), or near-field communications (NFC). Via these communication mechanisms, apparatus 10 may communicate identifier parameters 14 to vehicle mountable display device 16 for the display of an identifier at vehicle mountable display device 16. The identifier parameters 14 in this regard may comprise only identifier image parameters 14-2 displayable, or configured to be displayed, at vehicle mountable display device 16, since other identifier parameters 14, such as identifier location parameters 14-1 and identifier authentication parameters 14-3, is not necessarily required at vehicle mountable display device 16.

In some embodiments automatic revocation parameters may be provided with or as part of the identifier parameters 14, such that it is required to periodically or intermittently connect vehicle mountable display device 16 with apparatus 10 such that vehicle mountable display device 16 cannot be removed and used by a third party, beyond the time of the next periodic connection with apparatus 10, without access to apparatus 10.

In some embodiments, periodic and/or intermittent connection to resource 24 may be required for apparatus 10, in order to prevent automatic revocation of identifiers.

Apparatus 10 may be periodically and/or intermittently required to communicate with resource 24 in order to refresh an authorisation of apparatus 10 to provide the selection of identifiers for display at vehicle mountable display device 16. This means that the identifiers available for selection is maintained as a current and/or up to date list and that selection of an identifier, either automatically or manually, may be prevented when apparatus 10 has not received a refreshed authorisation. This refresh may be periodic at defined intervals, aperiodic, and/or based, at least in part, on other events.

Thus apparatus 10 requires periodic and/or intermittent handshakes with resource 24 to ensure that the data held on the apparatus is current and valid. Without such periodic and/or intermittent handshakes, authorisation for the use of data on apparatus 10 lapses and the selection of identifiers for display at vehicle mountable display device 16 is no longer possible. This may restrict and/or prevent apparatus 10 from functioning with invalid authorisations, and may therefore prevent abuse of the identifiers by an unauthorised user.

In the embodiment illustrated in FIG. 3, when the identifier has been selected to be displayed at vehicle mountable display device 16 and subsequently displayed at vehicle mountable display device 16, the identifier may be displayed at vehicle mountable display device 16 in a persistent manner, without vehicle mountable display device 16 being necessarily communicatively coupled to and/or with apparatus 10. That is, the identifier remains displayed at vehicle mountable display device 16 following disconnection of a coupling between apparatus 10 and vehicle mountable display device 16. An identifier, or at least identifier image parameters 14-2 which is displayable, or configured to be displayed, at vehicle mountable display device 16, may be stored locally at vehicle mountable display device 16 either on memory or on a persistent display.

In some embodiments, as illustrated in FIG. 2 and FIG. 3, when the identifier has been selected to be displayed at vehicle mountable display device 16 and subsequently displayed at vehicle mountable display device 16, the identifier may be displayed at vehicle mountable display device 16 in a persistent manner without apparatus 10 being necessarily communicatively coupled to resource 24. That is, an identifier may remain displayed at vehicle mountable display device 16 following disconnection of the coupling between apparatus 10 and resource 24.

Display of an identifier may persist whilst apparatus 10 is communicatively coupled, either periodically, intermittently or permanently, to resource 24 and/or vehicle mountable display device 16 is communicatively coupled, either periodically, intermittently or permanently, to apparatus 10, until the location parameter relating to vehicle mountable display device 16 no longer matches the identifier parameters 14 for the identifier.

Additionally or alternatively, the display of the identifier may persist whilst apparatus 10 is communicatively coupled, either periodically, intermittently or permanently to resource 24 and/or vehicle mountable display device 16 is communicatively coupled, either periodically, intermittently or permanently, to apparatus 10, until the identifier parameters for the identifier is revoked.

Additionally or alternatively, the display of an identifier may persist whilst apparatus 10 is not necessarily communicatively coupled to resource 24 and/or vehicle mountable display device 16 is not necessarily communicatively coupled to apparatus 10, until a predetermined time period has elapsed. Thus the identifier may be displayed at vehicle mountable display device 16 for a predetermined period of time. Such a predetermined period of time may be stored as part of identifier parameters in storage 18 of apparatus 10, or stored separately at vehicle mountable display device 16. A user may determine such a predetermined period of time, or the predetermined period of time may be automatically determined from, for example, payment of a requisite fee for a set period of parking time.

In embodiments where apparatus 10 is comprised in a mobile device separate to, and communicatively coupleable with, vehicle mountable display device 16, as illustrated in FIG. 3, vehicle mountable display device 16 may comprise sensing means in the form of a sensor 17 to detect a change of location or movement of vehicle mountable display device 16, and to attempt communication with apparatus 10 in order to reauthorise vehicle mountable display device 16 for display of an identifier. This may restrict use of vehicle mountable display device 16, should vehicle mountable display device 16 be stolen, and effectively provides a tamper mode which may only be unlocked by communicating with an authorised apparatus 10.

Sensor 17 may comprise one or more of: a location sensor, which may be in the form of a GPS sensor, to detect a change in location of vehicle mountable display device 16; or a movement sensor, which may be in the form of an accelerometer, a compass, a tilt sensor, yaw rate sensor, or similar sensor, to detect movement of vehicle mountable display device 16.

In embodiments where apparatus 10 is comprised in a mobile device separate to, and communicatively coupleable with, vehicle mountable display device 16, vehicle mountable display device 16 may act as an envoy device to an application running on the mobile device. Such an application running on a mobile device may access a digital wallet on the mobile device which contains identifier parameters 14 for one or more identifiers. A digital wallet may provide, or facilitate a push of, parameters to vehicle mountable display device 16 and revocation of parameters from vehicle mountable display device 16. A digital wallet may also provide payment facilities, allowing a user to pay for parking to facilitate use of an associated identifier. Such an application running on a mobile device may provide for automatic or manual selection of an identifier appropriate for granting access to a particular location.

In embodiments where apparatus 10 is comprised in a mobile device separate to, and communicatively coupleable with, vehicle mountable display device 16, as illustrated in FIG. 3, an extension to an authorised parking period may be requested using the mobile device even while it is not coupled to vehicle mountable display device 16, as long as the mobile device is coupled to resource 24. For such an extension to be requested, a user may initially purchase and/or obtain a parking ticket to allow parking for a defined period of time. It is envisaged, though not necessarily essential, that such a parking ticket may contain machine readable parameters for a parking attendant to scan and optionally user readable parameters that a parking attendant may understand. A user may remotely register an extension to a parking period to extend a length of stay of a vehicle in its current location. While a mobile device is coupled to vehicle mountable display device 16, then an identifier may be updated accordingly, which may provide an update of visual parameters for a parking attendant to understand and/or for an update of machine readable parameters on the identifier. While a mobile device is not coupled to vehicle mountable display device 16 then a identifier may not be updated, but a parking attendant may still be able to scan machine readable parameters which may then connect a reading machine to resource 24 which may then provide up to date parking parameters for the vehicle. In this way a user may avoid parking charge penalties and/or an inconvenience of vehicle recovery.

Vehicle mountable display device 16 may comprise a display 15 for displaying the selected identifier. Display 15 may be non-volatile, such that a displayed image persists without power being provided to display 15. Such non-volatile displays may be called e-paper or electronic paper.

Apparatus 10 and/or vehicle mountable display device 16 may comprise one or more solar panels and/or other energy harvesting device for providing power to an energy storage means of apparatus 10 and/or vehicle mountable display device 16 independently of any vehicle power system. Such an energy storage means may comprise a battery, capacitor array, supercapacitor, ultracapacitor, and/or similar charge storing device.

In an embodiment, apparatus 10 may be portable, and may therefore be transferred to another vehicle, such that an identifier, for which apparatus 10 contains permission to use, may be associated with another vehicle within which a user is travelling. This may allow a user to travel in different vehicles and still be able to validly park at a geographic location relating to an identifier.

FIG. 4 illustrates a schematic diagram of an example system 50 comprising a resource 24 to provide identifier parameters to one or more apparatus 10; and one or more apparatus 10, in a form of a user device such as a mobile device, each apparatus 10 comprising: a vehicle mountable display device 16; an input 12 to receive, from resource 24, identifier parameters 14 for one or more identifiers displayable at vehicle mountable display device 16; a data store 18 to store the identifier parameters 14 for at least one of the one or more identifiers; a locating module 20 to determine a location parameter relating to vehicle mountable display device 16; and processor 22 to select an identifier for display at vehicle mountable display device 16 based, at least in part, on stored identifier parameters 14 for one of the one or more identifiers matching such a location parameter relating to vehicle mountable display device 16.

Although FIG. 4 illustrates an apparatus 10 comprising a vehicle mountable display device 16, which is described in more detail above in relation to FIG. 2, in an alternative system, the arrangement of FIG. 3 may be provided where vehicle mountable display device 16 is separate from apparatus 10, apparatus 10 being in a form of a mobile device.

Resource 24 may receive identifier parameters 14 for an identifier from a provider 26 communicatively coupleable to resource 24. In the example of FIG. 4, three providers are shown 26-1, 26-2, 26-3, one or more of which may provide identifier parameters 14 for different identifiers. For example, a first provider may comprise a company parking permit provider, a second provider may comprise a national park permit provider, and a third provider may comprise a motorway toll card provider. One or more of these providers 26 may be coupled to a database 28 (shown only for one provider for clarity) which stores identifier parameters 14 for different identifiers and/or for different users. Database 28 may comprise membership details such that provider 26 only provides identifier parameters 14 for an identifier to resource 24 for distribution to an apparatus 10 when there is a valid membership allowing use of an associated identifier at apparatus 10.

In an embodiment, a first vehicle mountable display device 16 and a second vehicle mountable display device 16 may be available to a user, for example provided at each of two respective vehicles. A user may only have a single use identifier, for example a single parking permit for a specific geographic location.

In order to avoid abuse of a single parking permit by ensuring that such a parking permit is not actively in use on both of vehicle mountable display devices 16, apparatus 10 may be required to send a query resource 24, prior to display of an identifier at a first vehicle mountable display device 16, to query a database at resource 24.

A query of a database at resource 24, checks for any previous request for use of an identifier on a second vehicle mountable display device 16, by a user, and while a response from a database at resource 24 indicates a potential or actual current use of such an identifier on such a second vehicle mountable display device 16, then resource 24 may send a revocation request to such a second vehicle mountable display device 16, to prevent or revoke display of such an identifier on the second vehicle mountable display device 16, prior to permitting display of such an identifier on a first vehicle mountable display device 16.

Operation of apparatus 10 is described in the following paragraphs with reference to FIG. 5.

At block 100, the apparatus 10 may receive new identifier parameters 14 from a resource 24, or other connected service, for one or more identifiers which are displayable at a vehicle mountable display device 16.

At block 110, apparatus 10 may store identifier parameters 14 for one or more of the one or more identifiers.

At block 120, apparatus 10 may determine a location parameter relating to vehicle mountable display device 16.

At block 130, apparatus 10 may select an identifier for display at vehicle mountable display device 16 based, at least in part, on stored identifier parameters 14 for one of the one or more identifiers matching a location parameter relating to vehicle mountable display device 16.

If vehicle mountable display device 16 moves location, or is determined to have moved location, at block 140, then execution may return back to block 120, where a location parameter relating to vehicle mountable display device 16 may be determined for a new location.

Alternatively, at block 100, apparatus 10 may receive an update of existing identifier parameters 14 or a revocation request to revoke or delete identifier parameters 14 from apparatus 10, from a resource 24, for one or more identifiers which have been previously displayable at a vehicle mountable display device 16. If apparatus 10 receives an update of existing identifier parameters 14 or a revocation request to revoke or delete identifier parameters 14, then at block 110, apparatus 10 may update or delete, as appropriate, stored identifier parameters 14 for each of the one or more identifiers.

Blocks 120, 130 and 140 may continue in a loop until interrupted by receipt, at apparatus 10, of new identifier parameters 14, updated identifier parameters 14, or a revocation request for identifier parameters 14, wherein execution may return to block 100.

If, by receipt, at apparatus 10, of new identifier parameters 14, updated identifier parameters 14, or a revocation request for identifier parameters 14, a current identifier displayed at vehicle mountable display device 16 is no longer valid, or is no longer a most appropriate identifier to be displayed, then apparatus 10 may effectively deselect an identifier for display at vehicle mountable display device 16. This may then result in a current identifier being removed from display at vehicle mountable display device 16.

An operation relating to provision of new and/or updated identifier parameters 14 for an identifier, from providers 26 to apparatus 10, is described in the following paragraphs with reference to FIG. 6.

At block 200, user may authenticate apparatus 10 with resource 24, resource 24 being in the form of one or more remote computing devices such as in a cloud service, for example. Authentication may be performed via a digital wallet, comprising encrypted payment parameters and/or passwords for one or more services.

At block 210, resource 24 may query providers 26 for identifiers associated with an authenticated apparatus 10.

At block 220, one or more providers 26 may query associated databases 28 and associated parameters for possible identifiers relating to the authenticated apparatus 10.

At block 230, resource 24 may aggregate any resulting matches and transmit associated identifier parameters 14 to apparatus 10. Following transmission of such new identifier parameters 14 to apparatus 10, the method described in relation to the flow of FIG. 5 may then then followed.

An operation relating to renewal and/or revocation of identifier parameters 14 for an identifier, is described in the following paragraphs with reference to FIG. 7.

At block 300, a user may communicate with resource 24 via apparatus 10, for instance via a digital wallet of apparatus 10, or alternatively via a web portal and/or other communication method allowing authentication of user.

At block 310, user may be offered an option to renew and/or revoke identifier parameters 14 for an identifier.

At block 320, payment, reimbursement, or further authentication, may be performed with one or more providers 26, via resource 24.

At block 330, resource 24 may transmit relevant identifier parameters 14 to apparatus 10. Following transmission of identifier parameters 14 to apparatus 10, the method described in relation to the flow of FIG. 5 may then then followed.

The present techniques may take the form of a computer program 19 or computer program product embodied in a non-transitory computer readable medium having computer readable program code embodied thereon. The computer readable medium may be a computer readable signal medium and/or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog or VHDL (Very high speed integrated circuit Hardware Description Language).

Program code may execute entirely on apparatus 10, partly on apparatus 10 and partly on a remote computer and/or entirely on a remote computer or server. In the latter scenario, a remote computer may be connected or coupled to apparatus 10 through any type of network. Code components may be embodied as procedures, methods and/or the like, and may comprise sub-components which may take the form of instructions and/or sequences of instructions at any levels of abstraction, from direct machine instructions of a native instruction set to high-level compiled and/or interpreted language constructs.

It will also be clear to one of skill in the art that all or part of a logical method according to the embodiments of the present techniques may suitably be embodied in a logic apparatus comprising logic elements to perform steps of a method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of present techniques may be realised in the form of a computer implemented method of deploying a service comprising steps of deploying computer program code operable to, when deployed into a computer infrastructure or network and executed thereon, cause said computer system or network to perform all the steps of the method.

In a further alternative, embodiments of the present techniques may be realised in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications may be made to the foregoing example embodiments without departing from the scope of the present techniques.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The invention claimed is:

1. An apparatus comprising:
an input to receive identifier information for one or more identifiers displayable at a vehicle mountable display device;
a storage device to store identifier parameters for at least one of the one or more identifiers;
a locating module to determine a location parameter relating to the vehicle mountable display device; and
a processor to select an identifier for display at the vehicle mountable display device based, at least in part, on the stored identifier parameters for one of the one or more identifiers matching the location parameter relating to the vehicle mountable display device;
wherein the apparatus is communicatively coupled to the vehicle mountable display device to receive a communication from the vehicle mountable display device indicating movement of the vehicle mountable display device, the communication comprising a request for reauthorisation of the vehicle mountable display device for display of an identifier.

2. The apparatus as claimed in claim 1, wherein, for at least one of the one or more identifiers, the identifier parameters comprise identifier location parameters for defining: a geographical area within which the identifier is capable of being automatically displayed at the vehicle mountable display device; or temporal parameters comprising times and/or dates at which the identifier is capable of being automatically displayed at the vehicle mountable display device, or a combination thereof.

3. The apparatus as claimed in claim 1, wherein, for at least one of the one or more identifiers, the identifier parameters comprise identifier image parameters displayable at the vehicle mountable display device.

4. The apparatus as claimed in claim 3, wherein the identifier image parameters are persistently displayable at the vehicle mountable display device.

5. The apparatus as claimed in claim 1, wherein, for at least one of the one or more identifiers, the identifier information comprises identifier authentication parameters displayable at the vehicle mountable display device.

6. The apparatus as claimed in claim 5, wherein the identifier authentication parameters are persistently displayable at the vehicle mountable display device.

7. The apparatus as claimed in claim 1, wherein, for at least one of the one or more identifiers, the identifier parameters comprise identifier authentication parameters to be stored upon the vehicle mountable display device.

8. The apparatus as claimed in claim 1, wherein the location parameter comprises: a spatial parameter relating to a current geographic location of the vehicle mountable display device; or a temporal parameter relating to a current time and/or date, or a combination thereof.

9. The apparatus as claimed in claim 1, wherein the apparatus is communicatively coupleable to a resource to receive the identifier information from the resource prior to storing the identifier parameters at the storage device.

10. The apparatus as claimed in claim 9, wherein the resource to communicate updates of identifier parameters to the apparatus.

11. The apparatus as claimed in claim 1, wherein the apparatus is to receive revocation requests to revoke identifier information therefrom.

12. The apparatus as claimed in claim 1, wherein the vehicle mountable display device to be comprised in the apparatus.

13. The apparatus as claimed in claim 1, wherein the apparatus to be comprised in a mobile device separate to the vehicle mountable display device.

14. The apparatus as claimed in claim 13, wherein the apparatus to be communicatively coupleable to the vehicle mountable display device.

15. The apparatus as claimed in claim 1, wherein the storage device comprises a digital wallet on the apparatus, and the processor is to communicate with the digital wallet on the apparatus to select an identifier based, at least in part, on the identifier parameter for one of the one or more identifiers matching the location parameter relating to the vehicle mountable display device.

16. The apparatus as claimed in claim 15, wherein:
the apparatus is communicatively coupleable to a resource to receive the identifier parameters from the resource prior to storage of the identifier parameters at the storage device; and
responsive to a revocation request from the resource, the apparatus is to delete identifier parameters in the digital wallet.

17. The apparatus as claimed in claim 1, wherein the apparatus to communicate with a resource to refresh an authorisation of the apparatus to provide selection of identifiers for display at the vehicle mountable display device.

18. The apparatus as claimed in claim 1, further comprising a non-volatile display for the display of an identifier.

19. A method comprising:
receiving identifier information for one or more identifiers displayable at a vehicle mountable display device;
storing the identifier information for at least one of the one or more identifiers;
determining a location parameter relating to the vehicle mountable display device;
selecting an identifier for display at the vehicle mountable display device based, at least in part, on the stored identifier information for the at least one of the one or more identifiers matching the location parameter relating to the vehicle mountable display device; and
receiving a communication from the vehicle mountable display device indicating movement of the vehicle mountable display device, the communication comprising a request for reauthorisation of the vehicle mountable display device for display of an identifier.

20. A non-transitory computer-readable storage medium encoded with instructions which are executable by a processor to:
obtain identifier parameters for one or more identifiers displayable at a vehicle mountable display device;
select an identifier for display at the vehicle mountable display device based, at least in part, on the obtained identifier parameters for at least one of the one or more identifiers matching a location parameter relating to the vehicle mountable display device; and
obtain a communication received from the vehicle mountable display device indicating movement of the vehicle mountable display device, the communication comprising a request for reauthorisation of the vehicle mountable display device for display of an identifier.

* * * * *